Sept. 9, 1969 G. L. GUINOT 3,465,843
VEHICLE WITH IMPROVED STEERING DEVICE
Filed Feb. 26, 1968 3 Sheets-Sheet 1
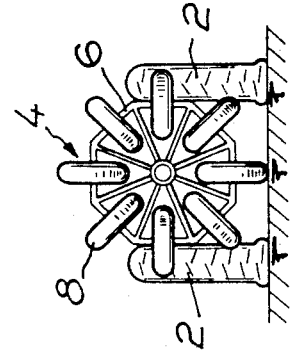
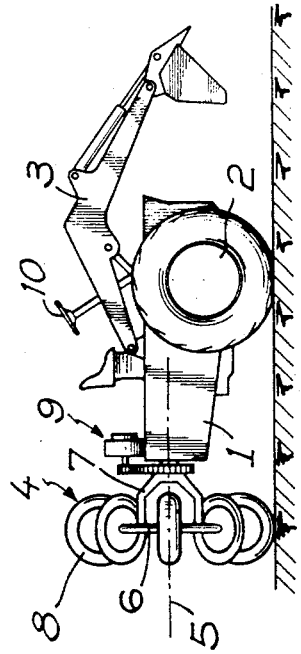
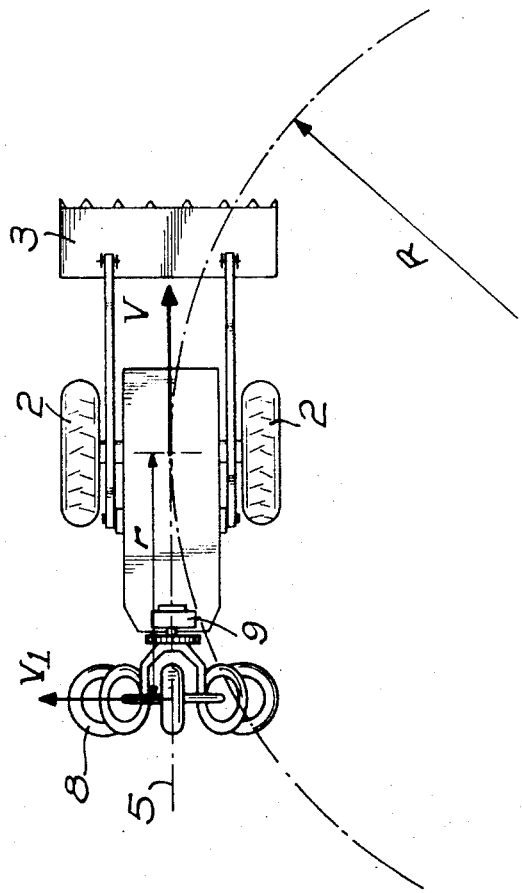
INVENTOR
GABRIEL L. GUINOT
BY
Mason, Fenwick & Lawrence
ATTORNEYS Sept. 9, 1969 G. L. GUINOT 3,465,843
VEHICLE WITH IMPROVED STEERING DEVICE
Filed Feb. 26, 1968 3 Sheets-Sheet 2

INVENTOR
GABRIEL L. GUINOT
BY
Mason, Fenwick & Lawrence
ATTORNEYS

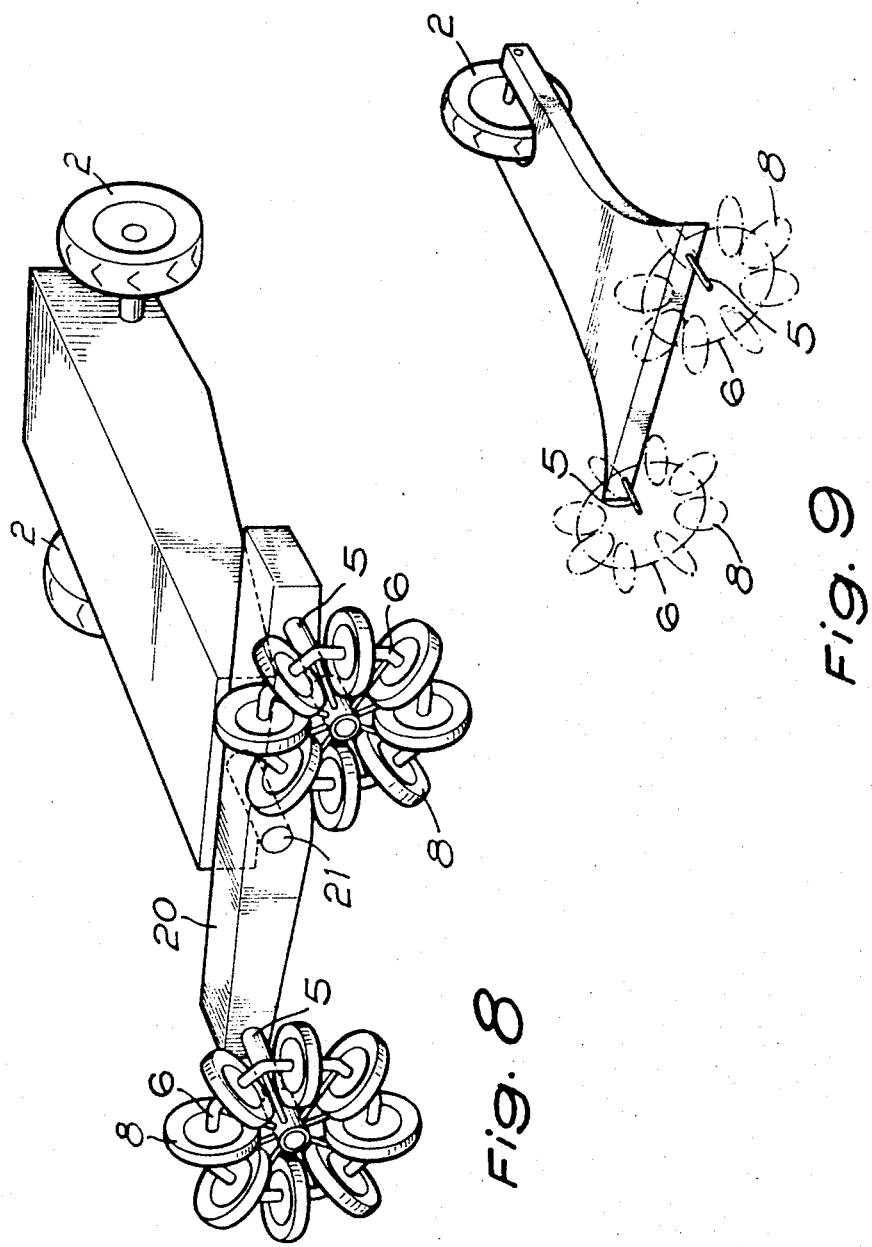

United States Patent Office 3,465,843
Patented Sept. 9, 1969

3,465,843
VEHICLE WITH IMPROVED STEERING DEVICE
Gabriel L. Guinot, Le Plessis-Belleville, France, assignor to Societe Anonyme Poclain, Le Plessis-Belleville (Oise), France, a French society
Filed Feb. 26, 1968, Ser. No. 708,129
Claims priority, application France, Apr. 27, 1967, 104,410
Int. Cl. B62d 5/00, 1/00
U.S. Cl. 180—79.3                    6 Claims

ABSTRACT OF THE DISCLOSURE

A vehicle incorporating a steering device mounted on the vehicle chassis for rotation in a substantially vertical plane transverse to the vehicle, the steering device having a plurality of carrier elements all having at least a portion of circular section and being pivotally mounted on respective axes transverse to the axis of rotation of the steering device.

---

This invention relates to vehicles and particularly to loading and/or transport vehicles adapted to manoeuvre over difficult terrain which may have an irregular surface or unsatisfactory adherence.

Steering arrangements on such vehicles are often inadequate to enable them satisfactorily to negotiate such terrain and the main object of the present invention is to provide a vehicle incorporating a steering device providing qualities hitherto unknown in such vehicles and enabling improved performance to be obtained over difficult terrain.

According to the present invention a vehicle comprises a chassis, means for movably supporting the vehicle on the ground and a steering device mounted on the chassis for rotation about at least one axis situated in a vertical plane parallel to the general longitudinal axis of the vehicle, the steering device having a plurality of carrier elements whereby steering forces are transmitted to the ground, at least a portion of each element being of circular section and each being pivotally mounted on the steering device about respective axes which are transverse to the axis of rotation of the steering device.

In order that the invention may be more fully understood, various embodiments in accordance therewith will now be described, by way of example, with reference to the accompanying drawings, in which:

FIG. 1 is a side elevation of a vehicle of the invention;

FIGS. 2 and 3 are respectively plan and end views of the vehicle of FIG. 1;

FIG. 8 is a diagrammatic perspective view showing yet another alternative arrangement of steering device of the invention; and FIG. 9 is a diagrammatic perspective view of a still further alternative arrangement of steering device of the invention.

Figure 4:
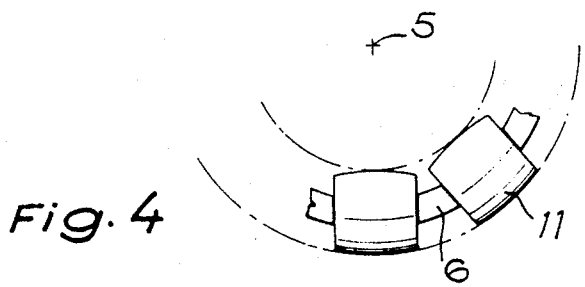
FIG. 4 is a view showing a part of a further embodiment of steering device of the invention.

The example chosen for description without any limitative intention is an "all terrain" machine equipped with a loading device.

This machine is in the form of a vehicle comprising a general chassis 1 carrying a motor which supplies two non-steerable driving wheels 2 with the necessary driving torque. The chassis is provided at the same end as the wheels 2 with a loading device 3 known per se. This positioning of the device 3 is not necessitated by the invention and this device can be installed at the opposite end of the chassis if desired.

In the example described, the chassis 1 is supported above the ground at its end remote from the device 3 by means of a steering device designated by the general reference 4. This device is mounted on the chassis 1 so as to be rotatable about an axis 5 substantially parallel to the general longitudinal axis of the vehicle.

In the present case, the axis 5 is contained in the general vertical plane of symmetry of the vehicle, as will be seen from FIG. 2.

The steering device 4 comprises a polygonal frame 6, shown as octagonal, joined by radial arms 7 to a hub which is rotatable about a shaft (not shown) concentric with the axis 5.

On each side of the polygonal frame 6 is mounted a wheel 8 so as to be freely rotatable. It will be seen that the rotational axes of the successive wheels 8 are disposed transversely, or more exactly orthogonally, to the axis 5 of the steering device 4.

There is also provided a known means, for example a set of toothed sprockets connected by a chain, for connecting the hub of the frame 6 to a transmission element 9, which is itself coupled by known means to a steering wheel 10.

When the steering wheel is not operated, the frame 6 can assume any position, such as that shown in FIG. 3 for example. If the motor now drives the wheels 2, in one direction or the other, the vehicle will move in a straight line.

If, however, the steering device 4, i.e. the frame 6, is turned by operating the steering wheel 10 while the vehicle is moving, the vehicle will turn about a vertical axis since the wheels 8 come successively into contact with the ground. Each time a wheel 8 is replaced on the ground by an adjacent wheel, the end of the vehicle is moved laterally by an amount equal to the distance which separates two wheels 8 measured on the circumference of the circle circumscribed by the assembly of these wheels.

It is clear that the faster the vehicle is moving, for example at a speed V, under the action of the wheels 2 (FIG. 2) the faster it is necessary to turn the steering device 4, for example at a speed $V_1$, in order that the vehicle shall describe a curve of given radius R.

If the distance separating the point of contact of the wheels 8 with the ground from the straight line passing through the point of contact of the driving wheels 2 with the ground is designated by $r$, there exists between V, $V_1$ and R the following simplified relationship:

$$\frac{R}{V}=\frac{r}{V_1} \text{ or } R=\frac{Vr}{V_1}$$

For fixed values of V and $r$, the radius of the turning circle R depends only on $V_1$. This constitutes the main advantage of the steering device of the invention.

If the two wheels 2 are free or connected by a differential, the vehicle can be pivoted when it is stopped about the vertical axis passing through the point O situated between the wheels 2 at equal distances from each latter.

It will be seen that the steering device of the invention produces no more resistance to forward movement of the vehicle in a straight line than a known steerable wheel arrangement. On the contrary, it enables a positive turning or slew couple to be obtained, which can be put into operation even when the vehicle is stationary.

FIGS. 4 to 7 show further embodiments of the invention.

It will be seen in FIG. 4 that the wheels 8 can be replaced by rollers 11 mounted for free rotation on a frame 6; the latter can also be capable of rotation about a central axis, such as the axis 5.

Figure 5:
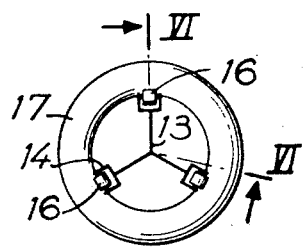
FIG. 5 is an end view of another embodiment of steering device of the invention.
Figure 6:
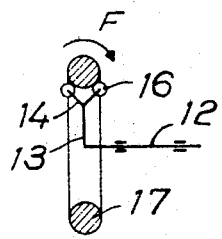
FIG. 6 is a section along the line VI—VI of FIG. 5.

In FIGURES 5 and 6 is shown a shaft 12 whose axis is parallel to the general longitudinal axis of the vehicle, as is the axis 5. The shaft 12 is provided with three radial arms 13, each ending in a fork 14. Each branch of each fork 14 is provided with a yoke 15 in which a roller 16 is mounted for free rotation.

There are thus three pairs of angularly spaced rollers on which is disposed a flexible toric tyre 17. The tyre 17 is concentric with the shaft 12. When the vehicle moves in a straight line, the tyre 17 turns on itself in the direction shown by the arrow F, while resting on the rollers 16.

The shaft 12 is, moreover, coupled to a steering wheel 10 of the vehicle. The end of the vehicle supported by the tyre 17 can thus be moved laterally as described previously. There is here an advantage, useful in certain applications, due to the use of a continuous surface for the lateral displacement, instead of a succession of supporting members, such as the wheels 8 or rollers 11 for example separated by spaces.

Figure 7:
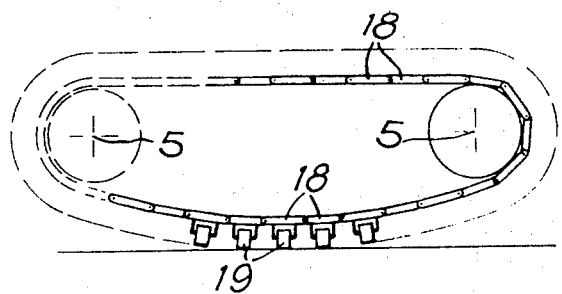
FIG. 7 is an end view of a still further embodiment of steering device of the invention.

In FIG. 7 there is shown a further embodiment of the invention in which the steering device has two transversely spaced axes 5 around which moves an endless device under the action of the steering wheel 10. This device is formed of segments 18 pivoted on one another and each segment has, on its outer face, a wheel 19 mounted free for rotation about a transverse axis which is orthogonal with the axes 5.

In the embodiments shown in FIGS. 8 and 9, the steering device comprises two transversely spaced assemblies each composed of a frame 6 and wheels 8. Each frame 6 can turn about its own axis 5.

The vehicle of FIG. 8 has two driving wheels at one end, while the two frames 6 are mounted on their respective axes 5 at the opposite ends of a beam 20, which is itself pivotally mounted on the end of the vehicle remote from the driving wheels about a shaft 21 lying along the general longitudinal axis of the vehicle.

In FIG. 9, there is only a single driving wheel 2. The steering device is identical to that of FIG. 8 except that the beam 20 is not present.

The operation of the embodiments of FIGS. 4 to 9 is the same as that for FIGS. 1 to 3.

The rotation in a direction transverse to the normal movement of the vehicle of the steering device 4 can be effected by means of a servo-motor operably associated with the steering wheel 10.

Various modifications can be made to the shapes of the parts and their relative movements; the invention is not limited to the embodiments described and shown, but covers all modifications or equivalents which remain within its scope.

What is claimed is:

1. A vehicle comprising a chassis, means for movably supporting the vehicle on the ground, and a steering device mounted on the chassis for rotation about at least one axis situated in a vertical plane parallel to the general longitudinal axis of the vehicle, said steering device comprising a plurality of carrier elements through which steering forces are transmitted to the ground, at least a portion of each carrier element being of circular section, said elements being pivotally mounted on the steering device about respective axes which are transverse to the axis of rotation of the steering device and control means on the vehicle for rotating said device for steering said vehicle.

2. A vehicle according to claim 1, wherein the steering device comprises a polygonal frame, a central pivotal hub and converging arms connecting the frame to the hub, the carrier members being mounted on the sides of the frame and arranged so that at least one contacts the ground at any one time.

3. A vehicle according to claim 1, wherein the steering device comprises a circular toric element, a rotary control device, pairs of rollers forming the carrier elements mounted transversely to the toric element and bearing on the innner surface of the latter with one roller of each pair disposed to either side of the medial plane of the toric element, yokes on which the rollers are mounted, and radial arms connecting the yokes to the rotary control device whose axis coincides with the axis of rotation of the toric element, the outer surface of the toric element being in contact with the ground.

4. A vehicle according to claim 1, wherein the steering device comprises a ring and rollers forming the carrier elements mounted around the periphery of the ring so that at least one roller is always in contact with the ground.

5. A vehicle according to claim 1, wherein the steering device comprises two spaced rotary members mounted for rotation about axes substantially parallel to the longitudinal axis of the vehicle, a plurality of segments hinged together to form an endless track, said track being rotatably disposed around the rotary members, and carrier elements in the form of rollers mounted on the outer surfaces of at least some of the segments.

6. A vehicle according to claim 1, wherein the steering device comprises a transverse beam pivotally mounted on the chassis, and two transversely spaced assemblies mounted on the beam, each assembly being composed of a plurality of carrier elements in the form of wheels arranged so that at least one wheel of at least one assembly is always in contact with the ground.

References Cited

UNITED STATES PATENTS

| 1,305,535 | 6/1919 | Grabowiecki | 301—5 |
| 1,947,598 | 2/1934 | Hollingsworth. | |
| 2,751,259 | 6/1956 | Bonmartini | 305—52 X |
| 3,253,632 | 5/1966 | Dalrymple | 301—5 X |

FOREIGN PATENTS

| 300,247 | 8/1917 | Germany. |
| 822,660 | 11/1951 | Germany. |

RICHARD J. JOHNSON, Primary Examiner

U.S. Cl. X.R.

301—5